United States Patent [19]

Buchanan

[11] E Re. 31,556

[45] Reissued Apr. 17, 1984

[54] KENNEL, CIRCULAR FACILITY

[76] Inventor: Robert R. Buchanan, 340 Rosewood Ave., San Jose, Calif. 95117

[21] Appl. No.: 178,306

[22] Filed: Aug. 15, 1980

Related U.S. Patent Documents

Reissue of:

[64] Patent No.: 3,991,717
Issued: Nov. 16, 1976
Appl. No.: 632,841
Filed: Dec. 4, 1975

U.S. Applications:

[63] Continuation of Ser. No. 961,274, Nov. 16, 1978, abandoned.

[51] Int. Cl.[3] ..... A01K 1/02
[52] U.S. Cl. ..... 119/19
[58] Field of Search ..... 119/19, 16, 28

[56] References Cited

U.S. PATENT DOCUMENTS

| | | | |
|---|---|---|---|
| 782,280 | 2/1905 | Shaw | 119/63 |
| 3,557,756 | 1/1971 | Ramsey | 119/19 |
| 3,584,603 | 6/1971 | Rutherford | 119/28 |
| 3,718,120 | 2/1973 | Schwartz | 119/16 |
| 3,791,348 | 2/1974 | Marnett | 119/19 |
| 3,919,976 | 11/1975 | Meyer et al. | 119/16 |
| 3,919,978 | 11/1975 | Schaefer | 119/19 |
| 3,924,571 | 12/1975 | Holman | 119/19 |
| 3,951,106 | 4/1976 | Wright | 119/19 |
| 3,980,051 | 9/1976 | Fury | 119/29 |

FOREIGN PATENT DOCUMENTS

| | | | |
|---|---|---|---|
| 1223268 | 2/1971 | United Kingdom | 119/19 |

*Primary Examiner*—Hugh R. Chamblee
*Attorney, Agent, or Firm*—Allston L. Jones; David A. Boone

[57] ABSTRACT

This patent applies to a kennel which incorporates a number of wedge-shaped partially covered enclosures, annularly disposed in an outer ring and inner ring separated by covered corridors.

It incorporates a series of gutters for waste removal which resists the spread of disease by means of an overhanging splash-inhibiting lip. It includes a number of compartment walls, each extending beyond the run and over the top to prevent animals from sniffing each other or coming in contact with each other, thereby inhibiting the spread of airborne and body waste diseases. A carefully designed airflow system, compatible with radiant floor heating, resists cross-contamination of animals from inadvertent intermixing of air; vents and ultraviolet lamp exposure assures purging and purification of compartment air. A special feeder nad waterer system allows servicing of animals without the need for attendant to enter the cages or enclosures; positioning control of animals is achieved by a four-way door manually actuated with attendant and facility needs.

13 Claims, 26 Drawing Figures

FIG. 6
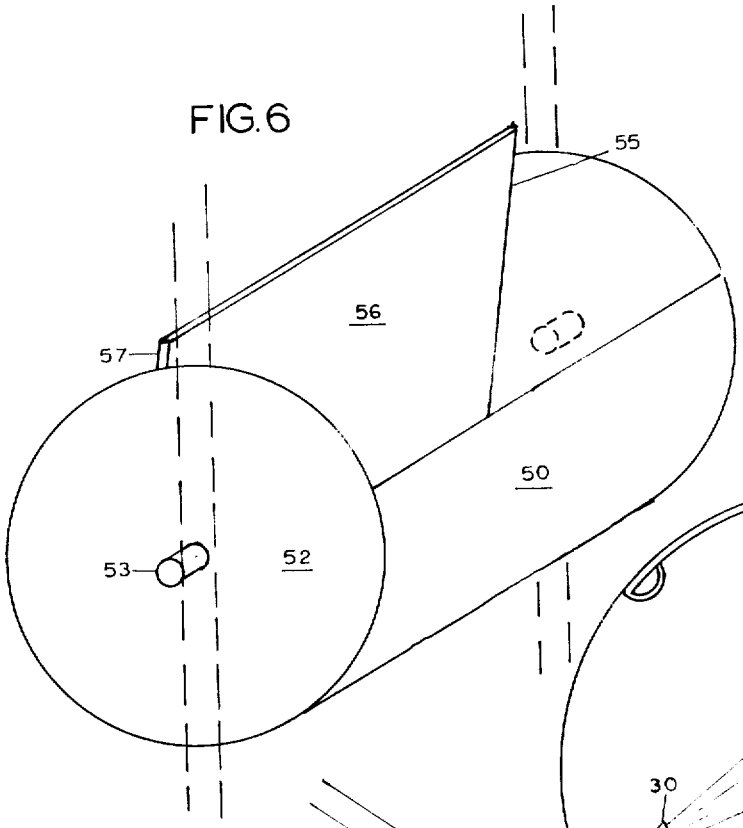
FIG. 7
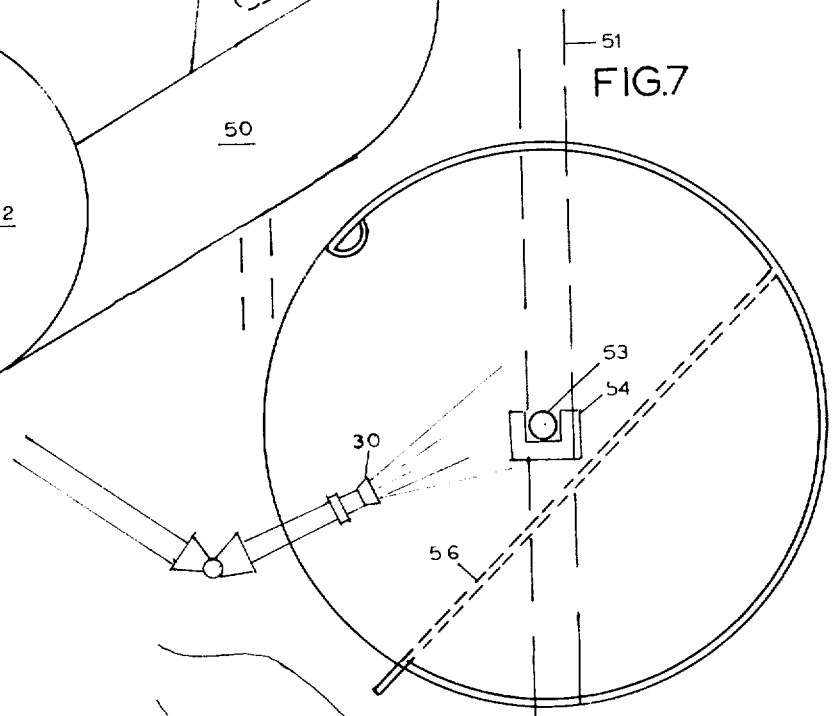
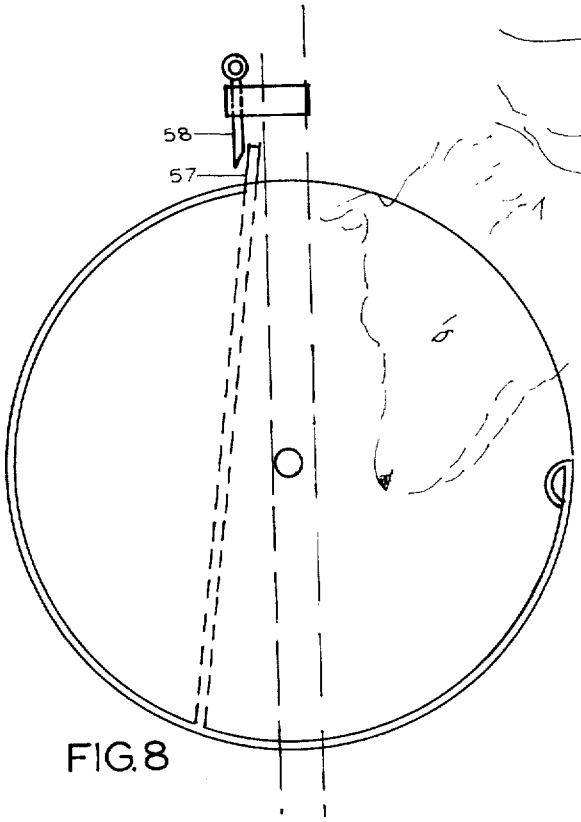
FIG. 8
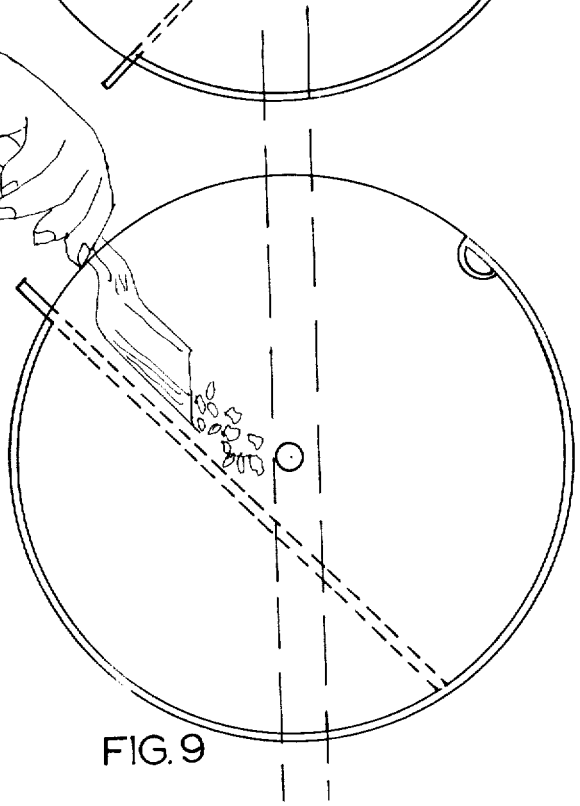
FIG. 9

FIG. 20
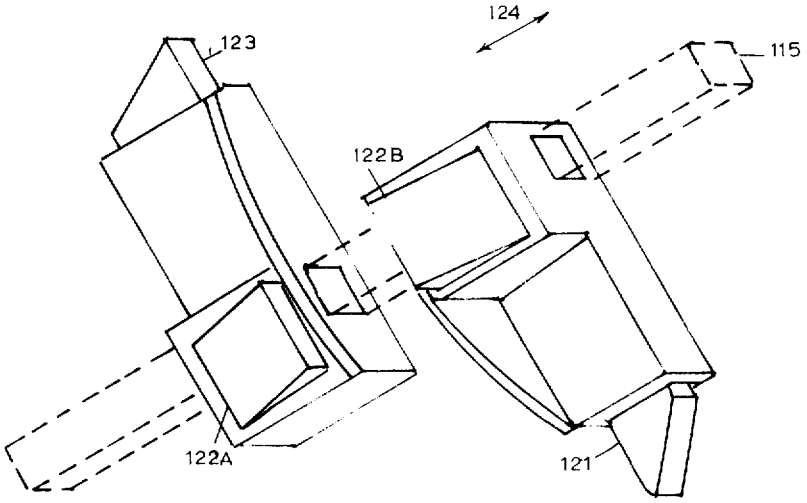
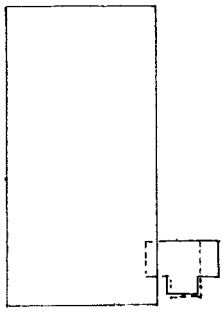
FIG. 21
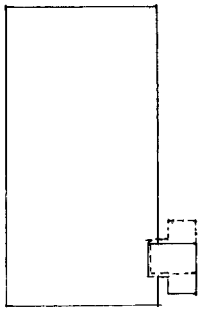
FIG. 22
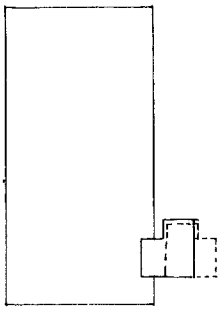
FIG. 23
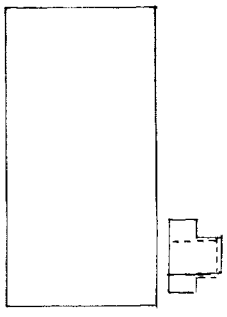
FIG. 24

KENNEL, CIRCULAR FACILITY

Matter enclosed in heavy brackets [ ] appears in the original patent but forms no part of this reissue specification; matter printed in italics indicates the additions made by reissue.

*CROSS REFERENCE TO RELATED APPLICATION*

*This is a continuation of reissue application Ser. No. 961,274, filed November 16, 1978, now abandoned.*

SUMMARY OF THE INVENTION

The present invention has to do with a circular (planform) kennel which incorporates a number of unique features, the sum total making a system or facility whose purpose it is to house or board a maximum number of animals of mixed breeds and species in such a way that they may be hygenically fed, and be sheltered for periods of time without interfering with other, with a minimum amount of manual labor. Also, the facility is particularly designed so that maximum advantage is made of the layout geometry to prevent spread of disease by: disease-barrier walls and gutters, isolated compartments so that cleansing wash water from one compartment does not enter other compartments, and airflow to and from one compartment does not enter any other compartment in the building.

Maximum attention is given to the control of repetitive tasks, most efficiently carried out by machines or combinations thereof. When individual attention to the animals is desired, attendant manual tasks are designed into the system. For example, feeding, watering, and movement of animals are only streamlined or semiautomated tasks.

(A)

Objects and advantages of the invention will be set forth in part hereinafter and in part will be obvious herefrom, or may be learned by practice with the invention, the same being realized and attained by means of the instrumentalities and combinations pointed out in the appended claims.

(B)

The invention consists in the novel parts, constructions, arrangements, combinations, and improvements herein shown and described.

(C)

The accompanying drawings, referred to herein and constituting a part hereof, illustrate one form of apparatus, and occasionally several forms of specific parts of the apparatus, for carrying out the process, and also shows an article of the invention, and together with the description, serve to explain the principles of the invention.

(D)

It will be understood that the foregoing general description as well are exemplary and explanatory of the invention but are not restrictive thereof.

(E)

The invention in its broader aspects is not limited to the specific steps, processes, compositions, and mechanisms shown and described, but departures may be made therefrom within the scope of the accompanying claims without departing from the principles of the invention and without sacrificing its chief advantages.

A further object of this disclosure is to tie the elements (parts) of the system into one unit by describing a number of subordinate elements as dependent claims. Those elements subordinate to this circular kennel facility are:

1. Disease-barrier gutter, FIG. 5
2. Kennel speed feeder, FIGS. 6, 7, 8, 9
3. Kennel speed waterer, FIGS. 10, 11, 12
4. Kennel disease-barrier walls, FIG. 18
5. Kennel interconnecting gates, FIG. 18 (80)(85)
6. Kennel four-way door, FIG. 19
7. Kennel airflow system, FIG. 26
8. Catch basin, FIGS. 13, 14, 15
9. Sonic motivators, FIG. 4

BRIEF DESCRIPTION OF THE DRAWINGS

FIG. 6 shows a perspective of the kennel feeder.

FIG. 7 shows kennel feeder in cleaning position.

FIG. 8 shows kennel feeder in feeding position.

FIG. 9 shows kennel feeder in filling position.

FIG. 19 is a typical four-way door while,

FIG. 20 is a perspective view of a four-way door mechanical latch.

FIG. 21 shows four-way door latch one way out only.

FIG. 22 shows four-way door latch locked to either direction.

FIG. 23 shows four-way door latch one way in only.

FIG. 24 shows four-way door latch both ways, free to egress/ingress to either of a given area.

DETAILED DESCRIPTION OF THE DRAWINGS

In the following text, the words INBOARD, INNERMOST, or INNER CENTER is intended to locate a point or place in the planview of the layout closest to the center of the layout or center of the circle which is the floor plan view. OUTBOARD, OUTER, or PERIPHERAL is meant to convey the outer extremities of the plan view layout, as in the annular ring of the kennel compartments remote from the center of the circular plan view.

Figures 1, 2, 3:
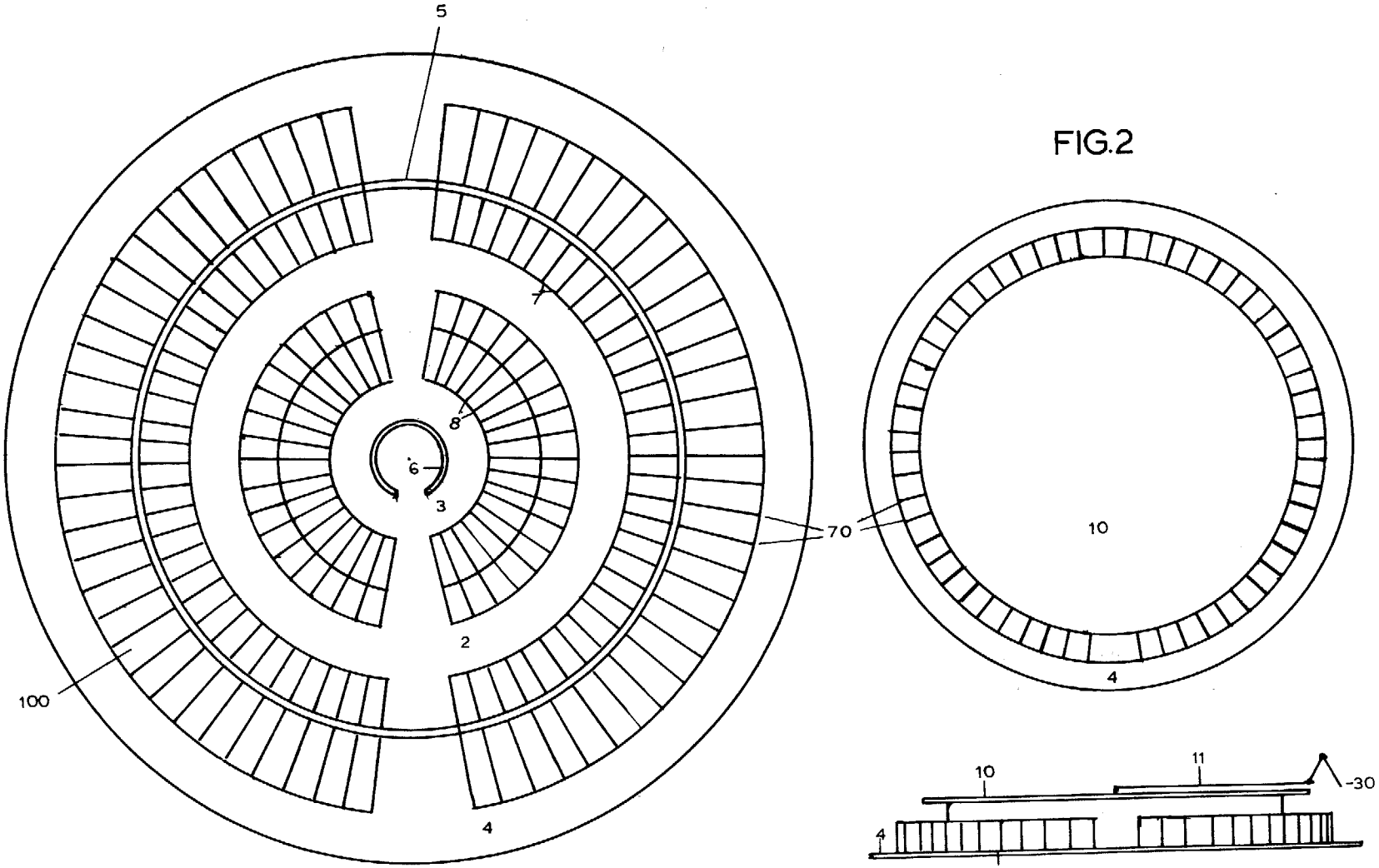
FIG. 1 is a typical floor plan view of the overall circular kennel facility.
FIG. 2 is a top view of kennel building.
FIG. 3 is a front elevation of kennel building exterior and shows outside water cleaning boom.

FIG. 1 shows typical layout of kennel, Circular Facility with outside runs 7 partially covered and inside runs 8 that are fully covered. Outside wall 5 and inside cylindrical cone wall 6 are both supporting walls, 2, 3 and 4 are walkways all unheated. Outside runs are 100, disease barrier walls are 70.

FIG. 2 shows top view of kennel, Circular Facility with roof 10, disease barrier walls 70 and outside walk 4.

FIG. 3 shows front view of kennel, Circular Facility with floor 9, outer walkway 4, outer shell wall 5, roof 10, outside cleaning water boom and water boom nozzlee 30.

Figure 4:
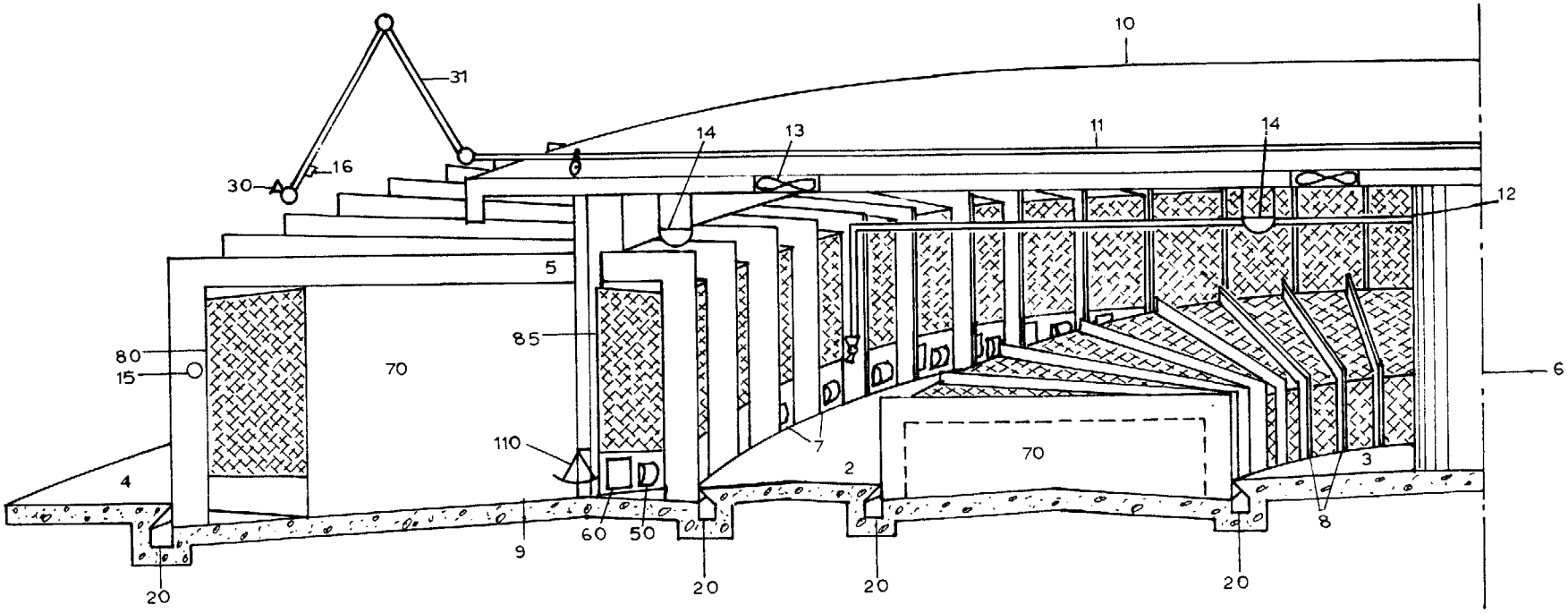
FIG. 4 is a partial perspective view of the circular kennel, showing inner and outer annular ring compartments, corridors, central core, roof, and outer wall of kennel, as well as inner and outer watering/cleaning booms, gutters, interconnecting gates, four-way door, sonic and/or supersonic motivators, speed feeder and waterer, ceiling exhaust fans and ultraviolet lamps.
Figure 26:
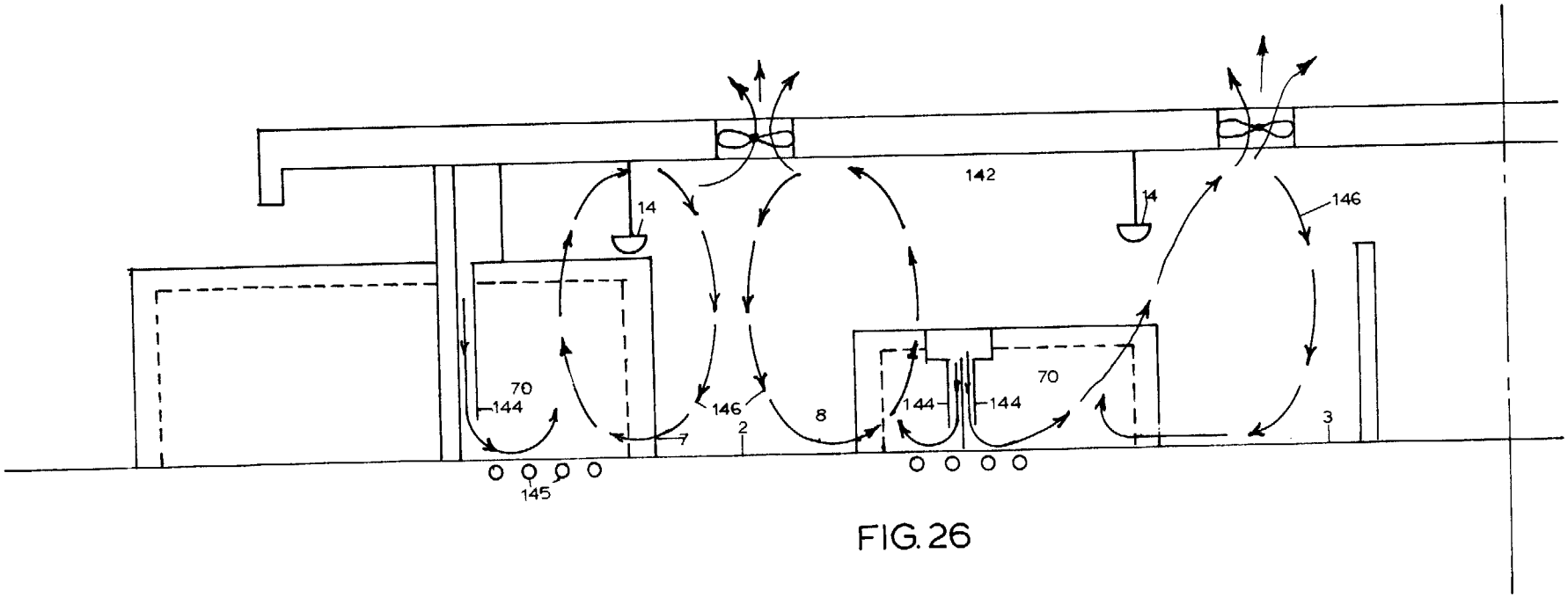
FIG. 26 is a cross-sectional view of the kennel facility showing the airflow pattern and air ducting.

Referring to FIG. 4, a cutaway perspective view of the circular kennel facility, the unique construction of the facility is best described by covering, in order, the floor 9 which contain the disease barrier gutters 20, wall 5, roof 10, central core 6, and watering booms 11 and 12, animal feeder 50, animal waterer 60, disease baarrier walls 70, interconnecting gates 80 and 85, four-way door 110 for animal control, sonic motivator wall mount 15 and sonic motivator 16 water boom mount may be used to motivate animals with use of sound so as to cause them to move to opposite end of kennel run, individually or all at one time. This is most usefull before clean-up time and to put dogs inside at night where local ordinances require it. The airflow system will be described in detail later (FIG. 26).

Figure 18:
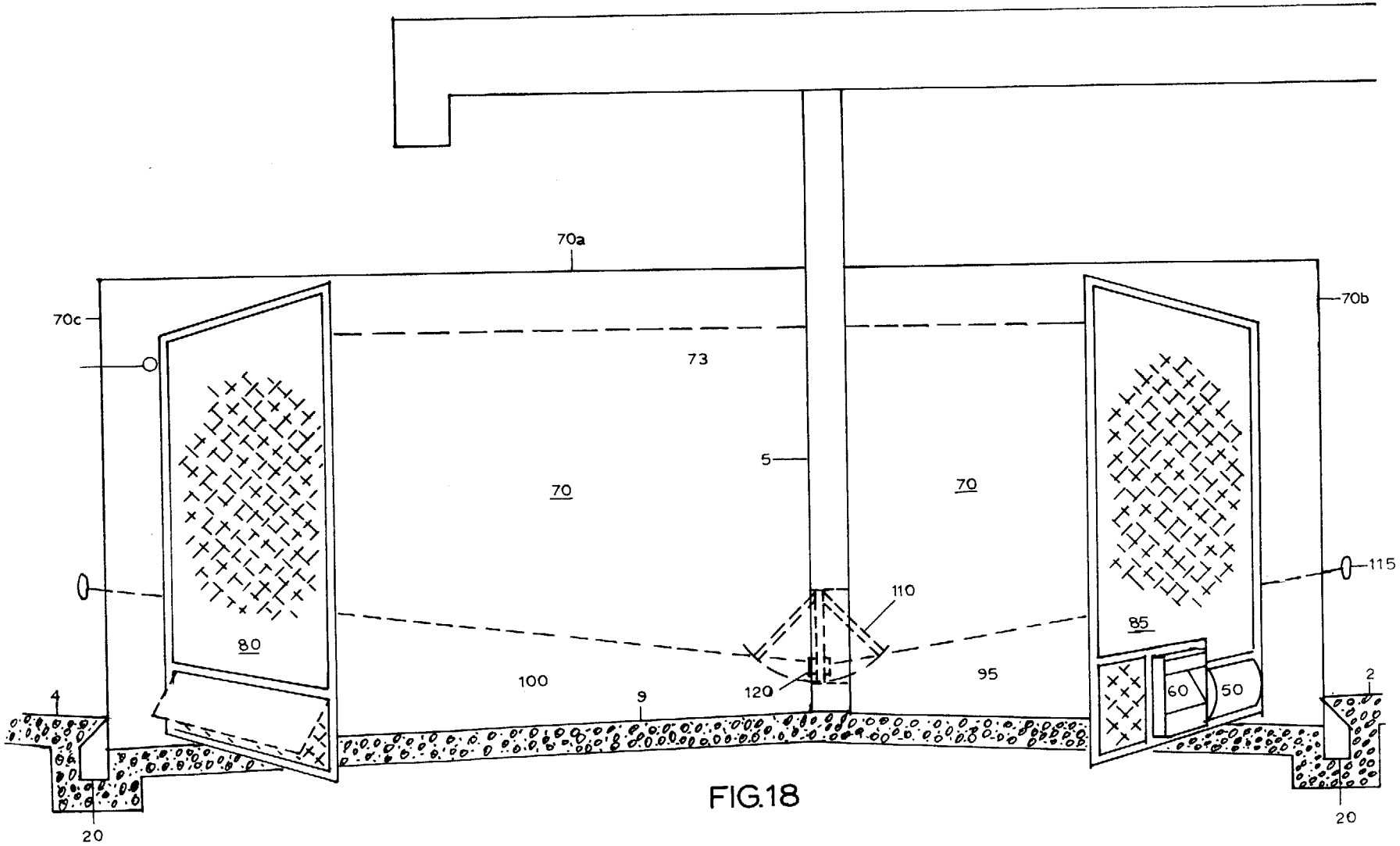
FIG. 18 is a cross-sectional view of a typical kennel compartment, including specifically the outboard gate.

Therefore, proceeding in this manner: FIG. 4 the floor 9, layout is circular, with 2 being the main walkway (hereafteer called the central walkway) for servicing the outer ring of animal compartments 7, partially covered by roof 10, and the inner ring of animal compartment, totally covered by roof 10. The outer walkway 4 is used for access to the runs 100 (FIG. 18) of the outer annular ring of compartments 7, and surrounds total kennel. The maiin corridor 2 series both the inboard feeding and watering compartment 95 (FIG. 18) of the outer annular ring of kennel compartments 7, and also serves to obtain access to the runs 100 (FIG. 18) inner ring compartments 8. The innermost walkway 3 (hereafter called the inner walkway), circles the control core 6, but likewise serves to obtain access to the inner ring of compartments 8, at the inner extremity of inner ring of compartments 8. The floor 9 is in reference to the whole floor, of which the walkways 2, 3, and 4, are only part; however, except for the brief description following, the floor 9, and hallways 2, 3, and 4, will be treaated separately for the sake of clarity. The continuous nature of the floor 9 is seen in FIG. 4. The only breaks in the surface of the concrete floor 9 are disease-barrier gutteers 20, which annularly bound on each side both the inner ring 8, and the outer ring 7, compartments, show clearly in FIG. 4 and in detail in FIG. 5. These gutters 20 (FIG. 5), are splash-inhibiting means for routing away to a sewer line 24 (FIG. 13), the debris, waste, wash water, and rain that may be present in outer 7, and inner 8, compartment rings. The objective of these gutters 20 is to convey away from the area of each run the urine, fecal matter, when washed away by a cleansing agent or water; however, anytime a water or antiseptic wash is splashed in a run 100 (FIG. 18), the very medium used for flushing can splash and splatter disease-laden germs back into the runs 95 or 100, or even into the corridor 4 (FIG. 18). This is undesirable, unhealthy, inefficient, and cured by this design of overhanging gutter. The disease-barrier wall 70 (FIG. 18), also subject herein (fing discussed in further detail later), prevents splash from cleansing water, etc., from penetrating laterally into other adjacent runs. The objectives of the disease-barrier gutter are accomplished by the following means using FIG. 5 as a reference: The basic elements, the disease barrier gutter, is shown as 20. The key feature of the gutter is the overhanging lip 26, which can be seen to be the uppermost inner surface of the gutter 20. Wash water splashing toward the gutter 20 cannot rise above the lip 26 onto the surface of corridors 2, 3, and 4, unless intentionally directed there. Likewise, any water splashing on floor surface 9 is directed to the gutter forcefully by the hydraulic jets of water boom nozzle 30, so no water can splash from surfaces 9 to 2, 3, or 4, because of the obliique angle geometry of the inner surface of the gutter overhanging lip 26. Any water directed on inner surface of the overhanging lip 26 or below can be seen to deflect downward into the gutter 20. Any water impinging on surface 2, 3, or 4, will flow over the overhanging lip 26, then will flow by gravity into gutter 20. At frequent intervals, such as every 3 or 4 runs, master catch basins 40 (FIG. 14) will be placed which will lead to a master sewer line 24, FIG. 14. In these master catch basins 40 are removeable screening buckets 41. Element 30, FIG. 5, the wash hose nozzle is attached by a swivel joint 28 which is, in turn, attached to the vertical-articulated line 27, which then connects to the inner boom 12 (FIG. 4). The folding arm 31, FIG. 4, is designed according to common hydraulic engineering principles and unfolds so as to move the nozzle 30 over the surface of the floor 9 at an oblique angle almost parallel to the floor 9. Waste matter and cleaning water are pushed along the floor 9 until they hit the inner floor gutter juncture 22. The interior boom 12, FIG. 4, can have a manual hose 27, FIG. 5, and manual control valve 29. The gutter geometry is such that waste and wash water always moves to a lower elevation than the overhanging lip side of the gutter. An outboard and inboard gutter 20 incorporate in a kennel system so that the highest point (elevation) of a compartment floor 9 is between two run-bounding disease barrier gutteers, allowing the wash water and debris to flow both by gravity and under forced hydraulic action from nozzles 30 toward gutters 20 whose overhanging lips confine the splash from going beyond the region of the gutters 20. The disease barrier gutter is positioned sufficiently far from a gate 80 or 85 (FIG. 18) as to disallow touching the region of the gutter 20 by contained animals. The end of the disease-barrier wall 70 terminates flush with the overhanging lip 26, so that a manually-handled hose (of a flexible construction) either at the inner end or outer periphery of a run(s), cannot inadvertently fall into the gutter 20 contaminating the very hose (that is, a cleansing hose) with germs that can be transported parasitically elsewhere in the kennel. Therefore, because of this unique overhanging lip 26, no animal, human, or hose can fall into the gutter 20.

Figure 5:
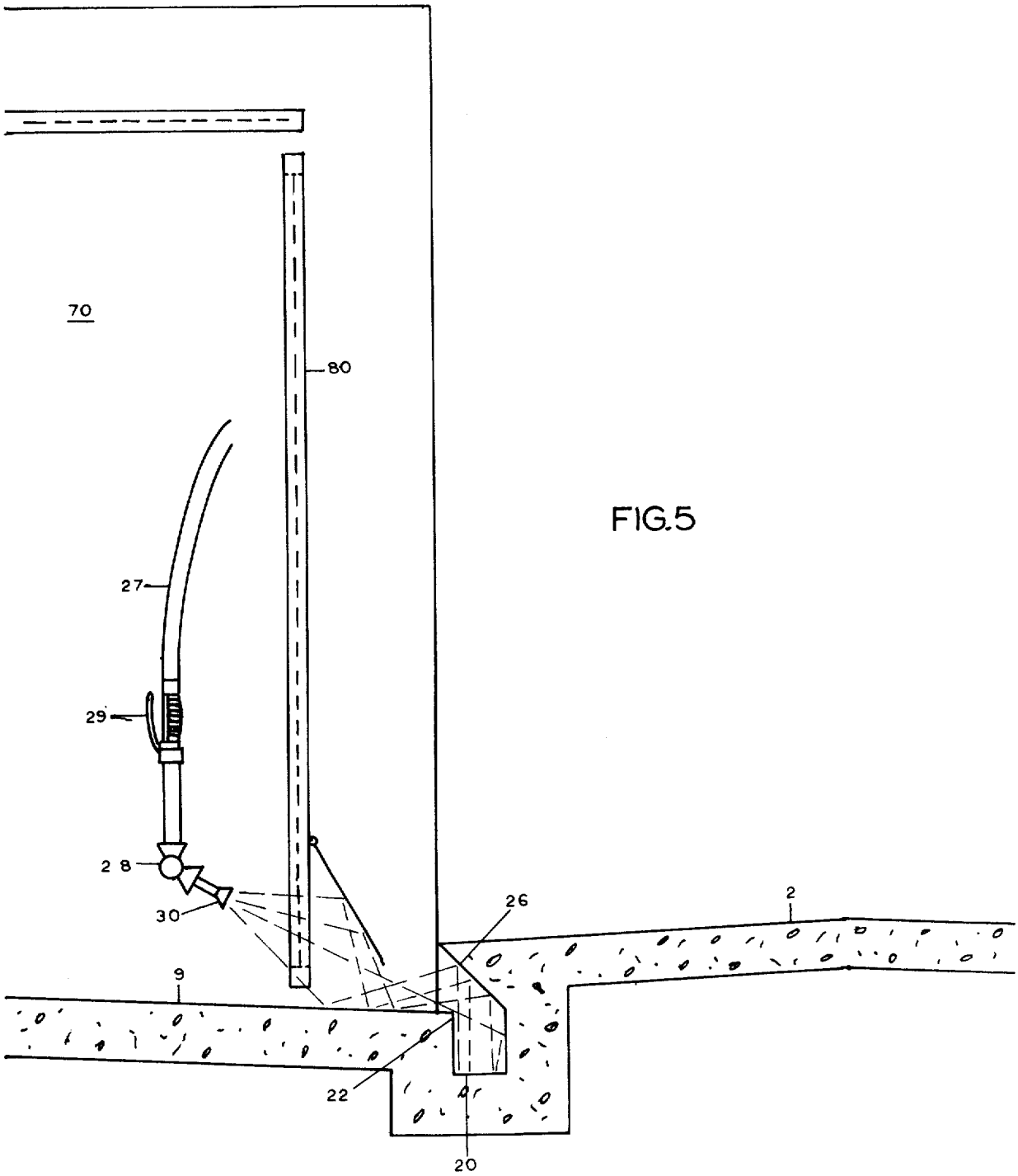
FIG. 5 is a cross-section of the disease-barrier gutter, adjoining compartment structure, floor, and washing boom and nozzle.
Figure 13:
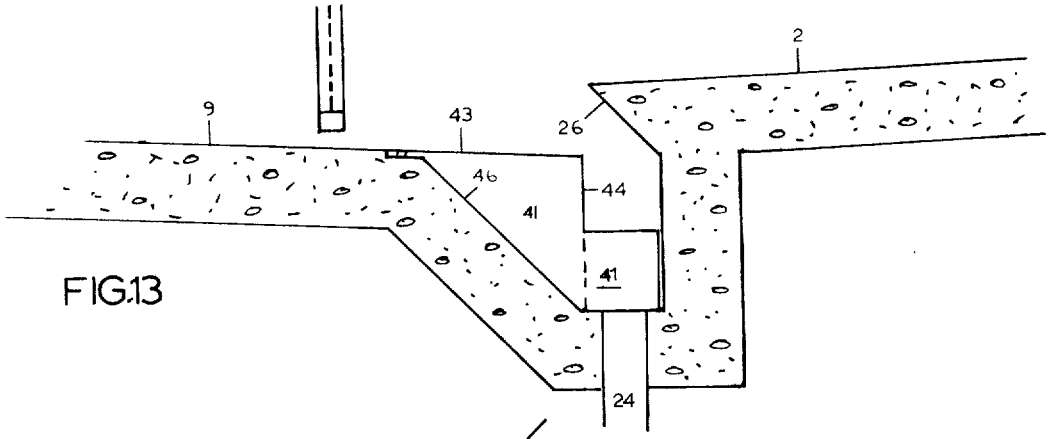
FIG. 13 is a side view of catch basin and removable screening bucket.
Figure 14:
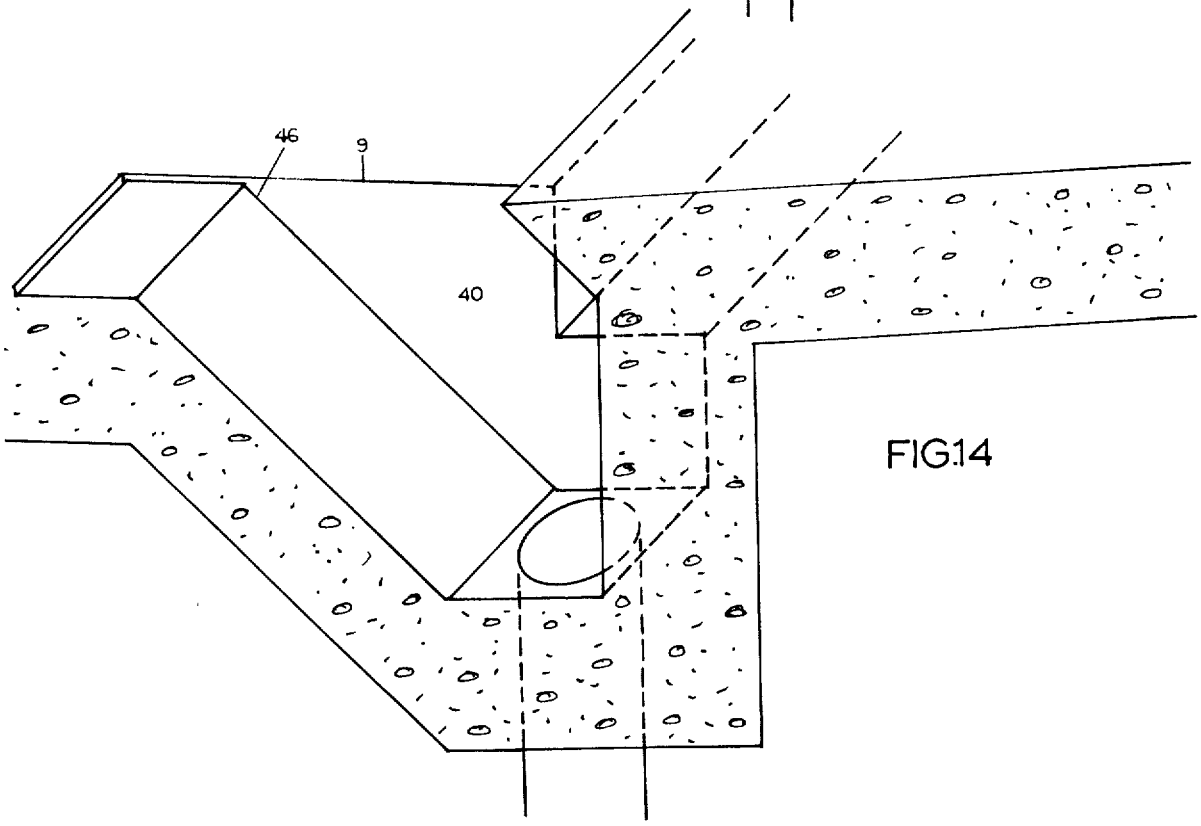
FIG. 14 is a prospective view of a catch basin which is compatible with the disease barrier gutter.
Figure 15:
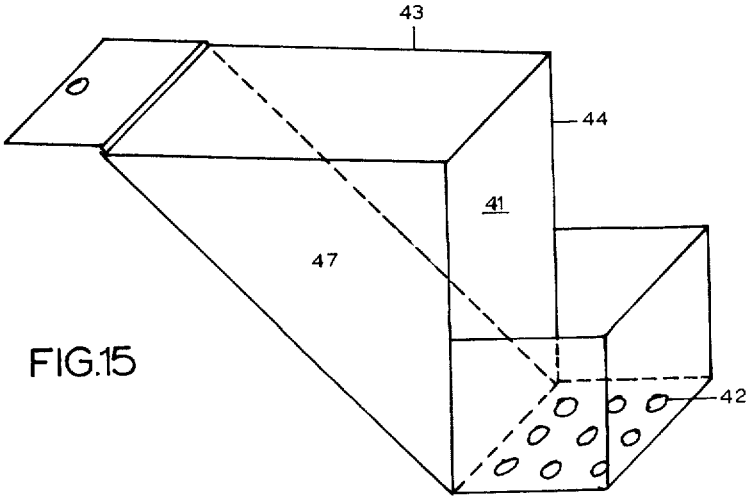
FIG. 15 is a catch basin removable screening bucket.

A catch basin 40, FIGS. 13, 14, 15, and removable screening bucket 41, which are compatible with the disease barrier gutter 20 (FIG. 5) is shown in FIGS. 13, 14, 15. This catch basin 40 FIG. 14 causes and is a change in the structure of the floor itself 9; namely, the formation of a recessed gutteer wall 46 (FIG. 14) and a recessed open for a sewer line 24, FIG. 13. This recessed gutter wall 46 is shown as flat and parallel to the interior face of the disease barrier gutter overhanging lip 26, though it doesn't necessarily need to be so. The removable screening bucket 41 (FIG. 15) is a rectangular box with an extended lip forming plate 43 and 44 so as to form a lip of approximately 90 degrees so as to conform to the slope of the rest of the disease barrier gutter. At the base of the removable screening bucket is a screen 42, which fits over the opening to the sewer line 24 FIG. 13. The upper portion of the lip forming plate 43 runs continuous with the floor 9, while the lower portion of the lip forming plate 44 runs continuous vertically with the rectangular box-like portion of the removable screening bucket 41 and continues horizontally with the inner wall of the disease barrier gutter 20 (FIG. 5). A support brace 47 can be added between the rectangular box-like portion and the outermost part of the upper lip forming plate 43. The rectangular box-like shape of the removable screening bucket 41 is convenient, but round, or any other shape, will do.

The circular kennel outer wall 5 of FIGS. 1, 3, 4, is the cylindrical shell that supports the roof 10 (FIGS. 3, 4) at the outer extremity; at the center of the layout a utility area, or central core 6 (FIG. 4) comprising a cylindrical core of minimum diameter is used to house electrical, water, gas, and airflow equipment, as well as possible programming equipment for semiautomatic functions. This cylindrical core 6 serves to support the roof 10 at the inboard end of the span, or center of the circular roof 10. Penetrating the roof 10 FIG. 4, are exhaust airflow vents 13 exhausting air from the compartments 7 and 8; these vents exhaust the contaminated, moist, compartment air, as the final step in the airflow system cycle (see FIGS. 25, 26 for flow diagram of system wherein exhausting take place at the end of total flow process of airflow system). Spanning the roof 10, FIG. 4, the exterior radial water boom 11 extends beyond the extremity of the outer compartments 7 to wash the runs. Similarly, the interior water boom 12, pivoted and braced from the central core 6, swings under the roof radially over the inner ring 8 of animal compartments. This boom serves to cleanse the inner runs 8 and the feeding compartments of the outer runs 7, from the central corridor 2.

Figure 17:
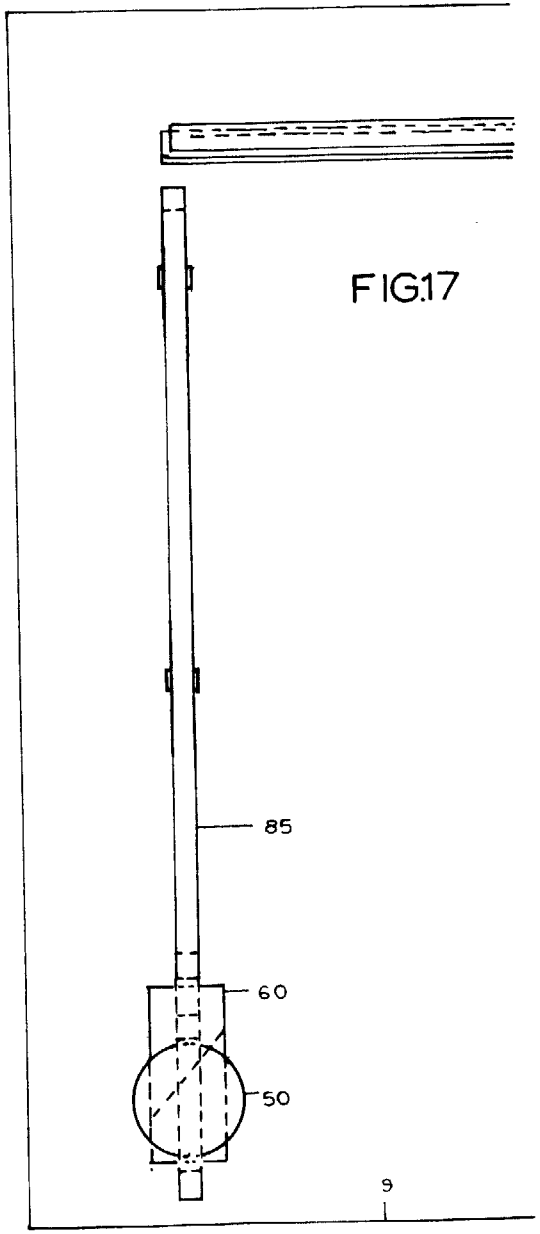
FIG. 17 shows a side view of typical inboard gate for kennel compartment.
Figure 16:
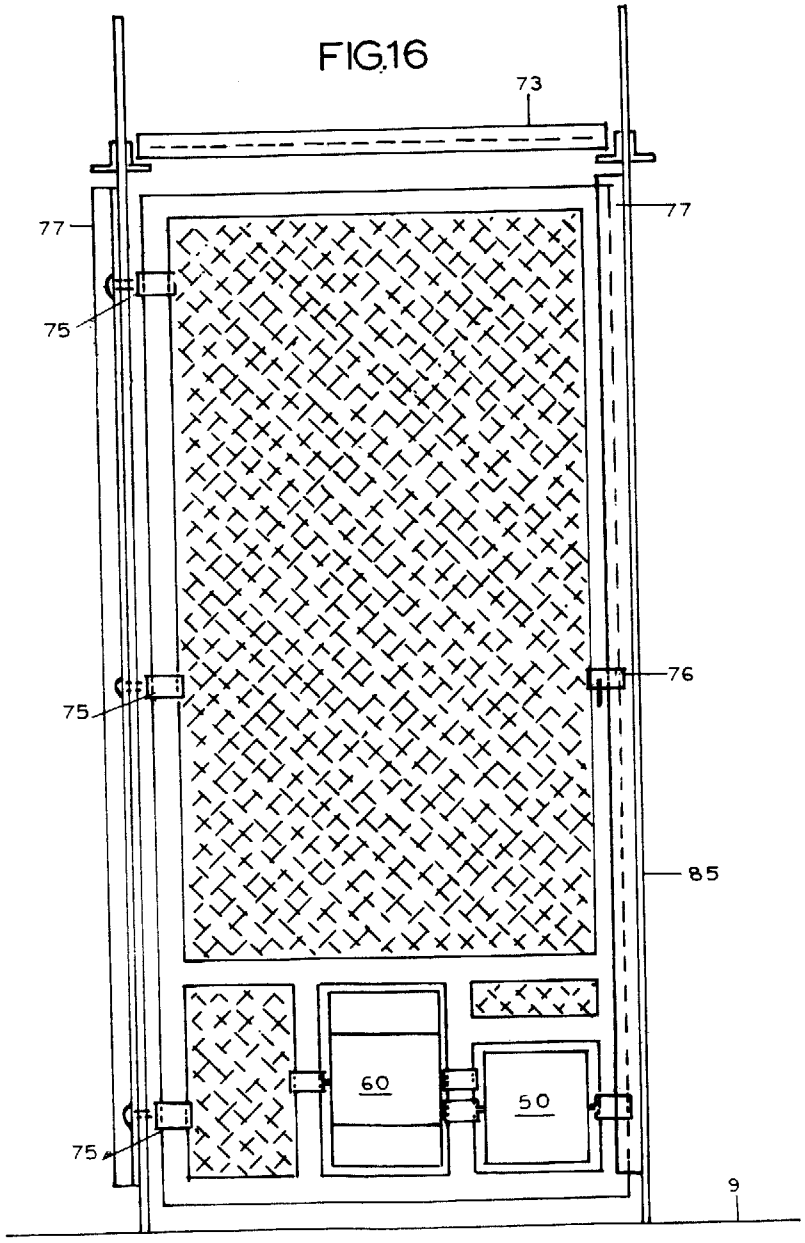
FIG. 16 shows a front view of inboard gate for the typical kennel, compartment.

Using FIGS. 6, 7, 8, 9 as a reference, the animal feeder 50 is an efficient hygenic, rotatable container for both feeding of the animal (with both dry and moist types of animal food), and the replenishment thereof by quick, manual, rotation of the horizontally-oriented cylinder which contains the food, to such a position as to allow emptying and cleansing of the container 50 and restoring food to an appropriate level by a human attendant from the central corridor 2 (FIG. 4) of a kennel run 7 or 8. The feeder 50 is then rotated to the animal side of the interconnecting gate 85 (FIG. 4 and FIG. 18), for the animal's safe, unemcumbered feeding. (Present day kennels, likewise, rely on the services of human attendants to feed and water boarded kennel animals because feeding time is the one time that communication and contact with all animals is desired. Our method allows the attendant to talk to the animals in a positive manner, not having to frighten or kick the animals back because the feeding task doesn't require the opening of gates, entering the compartment, and filling a separate container with feed within the compartment. Therefore, this necessary human function can be carried out in an efficient and positiive fashion). The objective, then, of the speed feeder is to assure efficiency of human attendant tasks of container cleansing and transposing of food from the service side of kennel compartment (as along the central corridor 2) to the animal side for subsequent consumption by the boarded animal. With this invention there is no need to open the gate 85 with the inevitable possibility of the animal slipping by the attendant and escaping to roam the compound. Referring to FIGS. 6, 7, 8, 9, the speed feeder 50 is basically a cylindrical container of select dimensions such that approximately one quarter of the cylindrical surface is absent; the partially-surfaced cylinder 50 is mounted in vertical support members 51 FIG. 7 of the parent compartment structure, i.e., the gate 85 (FIGS. 16 and 17). The cylinder is rotatable around its' cylindrical axis by means of journals 53 which are centered at ends of cylinder 52. These journals 53 rest in mating, U-shaped cups 54 of vertical, parent, supporting structure 85 (FIG. 17). Within the cylinder, and acting as a cylindrical bisector, is a rectangular plate 56 the long end of which is rigidly attached at 55, the cylinder wall, and is fastened to inner surface of the cylinder 50. The function of this plate 56 is to reduce the usable volume of the cylinder 50 to somewhat more than half so that the feeder 50 can easily be cleaned by the hydraulic cleaner 30 (FIG. 5). The functions of the various members are shown in FIGS. 7, 8, 9. FIG. 7 shows the cleaning position, FIG. 9 the loading position, and FIG. 8 the feeding position. When cleansing of the container and washout is desired, the cylinder 50 is rotated 135° counterclockwise (CCW) such that a hose nozzle or water under pressure are impinged on inner surfaces of container 50 as in FIG. 7. Water and spoiled food are washed down by gravity along the slanted surface which is the rectangular plate 56. Complete food container volume is flushed out by spray cleaning, while the unused portion of the cylinder 50 is sealed for hygenic purposes. Upon completion of the cleansing process, the cylinder 50 is rotated to position of FIG. 9, 45° off the normal feed position, and 50° clockwise (CW) from the previous wash position. At this FIG. 9 position, replenishment of feed can be achieved; the feeder, having been filled, is then rotated 45° clockwise (CW) to the feeding position FIG. 8, and the protruding lip 57 is fastened with a latch 58 so that the feeder 50 is securely in place.

Figure 10:
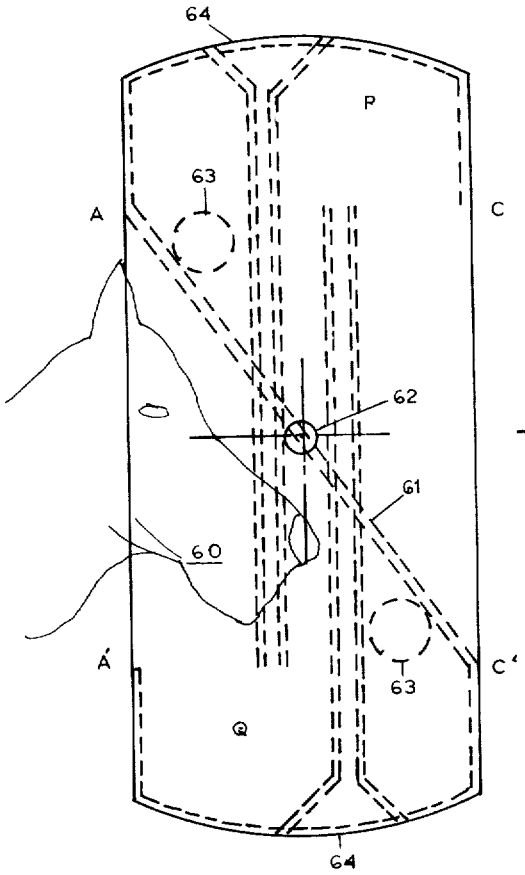
FIG. 10 shows side elevation of waterer.
Figure 11:
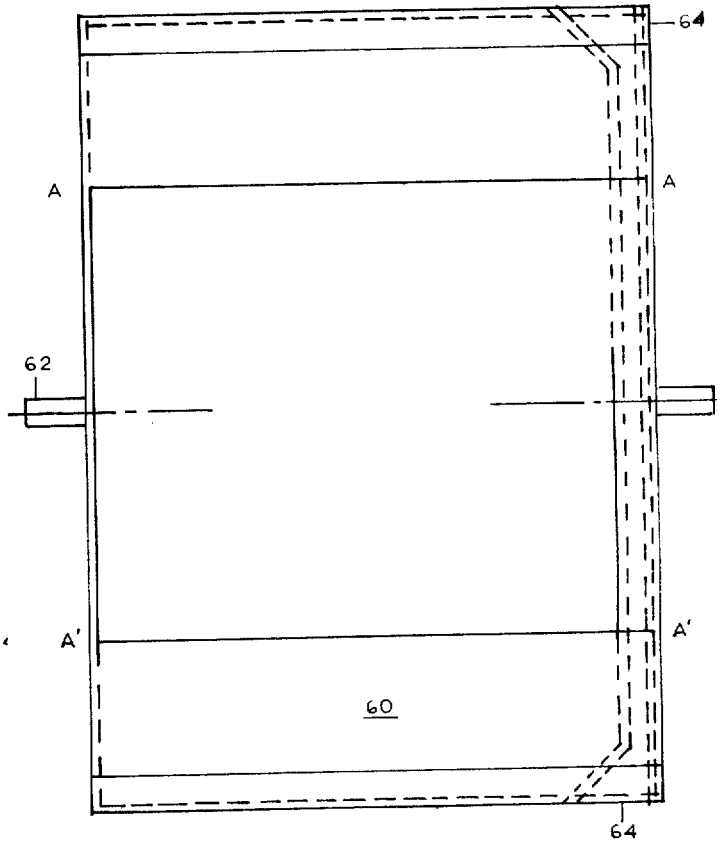
FIG. 11 shows front elevation of waterer.
Figure 12:
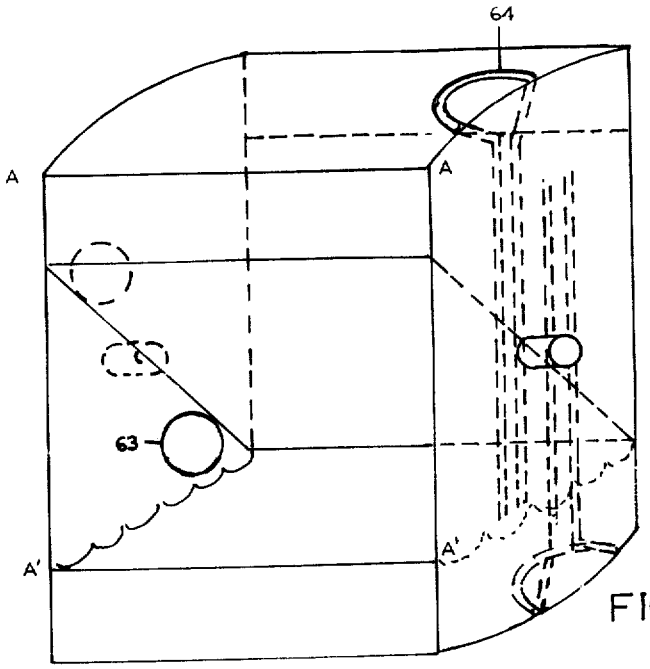
FIG. 12 shows prospective view of waterer.

Using FIGS. 10, 11, 12 as a reference, the kennel speed waterer 60 is an efficient, hygenic, rotatable container for watering of boarded animals, and the replenishment thereof by quick, manual rotation of the container 60 to such a position as to allow emptying and cleansing of the two position container 60 of any algae which may have formed on the wetted surface of the container 60 allowing it to dry while a second volume (previously emptied and cleansed of algae or other microorganisms from an earlier watering by the attendant) is filled with water for animal drinking purposes. The container design is such that cleansing and drying out of the previously-filled portion of the container can be accomplished from service corridor 2 (FIG. 4), while the other half of the container, cleaned and dried from earlier usage awaits filling by the attendant. This container, therefore, makes it possible to water the animals without the algae buildup and without the troublesome float valves present in most automatic waterers. It also eliminates the separate removal and washing of containers. Above reference is made to FIGS. 10 and 11, which contain an end view and an elevatiion view, respectively, while FIG. 12 is a three quarter, perspective view. The waterer 60 is basically a rhomboid or rectangular solid whose two larger faces (designated by FACE A and FACE C) of FIG. 10 are open for animal head penetration from AA to A'A' and CC to C'C' on the opposite face (FIG. 11). The solid portion of each face makes up the containment wall for the water housed therein. When positioned as shown in FIG. 12, the waterer may be filled via the top of the fill pipe 64. Excess water will flow out the overflow port 63. Diagonally separating the rhomboid 60 into half volumes is flat rectangular platee 61, FIG. 10, which runs from AA on front face of volume to C'C' on rear face of rhomboid. The purpose of this portion is to (1) separate the volume into two truncated halves for servicing means, and (2) to prevent an animal from pssing its head through the waterer. While in this position, the animal's head may penetrate to the extent of plate 61 while drinking water from the lower half of the device. While this watering process is proceeding with the animal in the run feeding quarters, shown as being on the left (FIG. 10), the right half of the container (which is, in this position, inverted), may be cleaned out and dried by an attendant who is standing in a service corridor 2 (FIG. 4). In the process of cleaning, water spray, solids, debris, or wall coated algae may wash down the rectangular plate 61 outside the container, past point C'C' of FIG. 10, into the gutter 20 (FIG. 4) bounding the central corridor 2. Having cleaned and dried the previously filled portion of device 60 as from AA, CC upward, the device is rotated manually about the side centers. By rotating container about the journals 62, the water in the lower half is flushed out and down diagonal bisecting plate 61 agaiin, into corridor-bounding gutters 20 (FIG. 4). The Q, the volume of stagnant water, is drained while the P (FIG. 10) volume side of container awaits manual or automatic filling of fresh water via the fill pipe 64. Upon filling the P, the new lower volume of the container, to level of opening 63, the animal may drink of the fresh water in P while the attendant washes out and cleanses, and dries the-now-upper container portion, Q.

As previously mentioned, the roof 10 FIG. 3 is of conventional fabrication, as is the cylindrical shell or wall 5 and inner core 6 (FIG. 1), except that the latter two are cylindrical shells. Abutting the cylindrical wall 5 are the radial elements, i.e., disease barrier walls 70, which separate one compartment from another and are described as follows: all numbers refer to FIG. 18. This portion of the patent has to do with basic structural element(s) for a kennel of circular layout. The disease barrier walls 70 of the unit compartments 7 and 8 (FIG. 4) form an important integral part of each kennel enclosure. The general object of the disease barrier walls 70 and their construction in relation to the disease barrier gates 80 and 85, and enclosure roof 73, is to completely separate one animal and the passage of its own germs from itself and its' contained volume to any neighboring "runs" or corridor. This is accomplished by the following general means:

a. Physically disallowing neighboring animals to touch or sniff each other, around corners or over the top of the compartment, because the extension of walls 70 above and beyond the gates 80 and 85, and enclosure roof 73, which inhibits the transfer of air between these areas. Thus, the passing of airborne germs is inhibited, and, b. Passively serving as a physical barrier to disease-spread and transmission by preventing splashing of cleanup water and wasteborne germs from one run to the next.

c. Also a subject of this patent, and an element of the system working in conjunction with it, is the channeling and effective containment of airflow in the total kennel (FIG. 26), as distributed by a kennel air distribution system. The disease barrier walls 70 (FIG. 26) serve to individualize quantities of air brought into run compartments 7 and 8 through the input channels (as in 141 in FIG. 26). This will be discussed in more detail later.

The above objectives are attainable in all the interior areas of the building, i.e., that which is affected by the airflow system (described later). The "interior areas" are all areas interior of the cylindrical wall 5 (FIG. 1). FIG. 18 shows two principal areas of each kennel compartment, the run area, and the living area. Referring to FIG. 18, kennel unit walls or run walls are identified as 70. These disease-barrier walls 70 separating runs can be constructed of solid nonporous material such as cement, or organic material, such as asbestos, in which case it is best to seal the material. The design need only be sufficiently strong to serve as only a separation barrier, not a load carrying wall of the overall kennel (i.e., construction frame) but at the same time it should be imprevious to clawing and chewing by the animal. The solid walls 70, as part of the perimeter of each run compartment, FIG. 18 and FIG. 4, contain and prevent cleansing water with contaminated feces, urine, etc., from spreading to other compartments or housing units. The tops 70a and ends 70b and c (70b is inboard feeding, watering end; 70c is outboard running/cleansing end) of the barrier walls 70 are extended beyond the roof 73 and gates 85 and 80, FIG. 19 (please note that the functions of the inboard as feeding area and outboard as run can easily be reversed, especially in the interior compartments 8 FIG. 4). Outboard disease barrier gate 80, inboard feeder, waterer gate 85 and porous ceiling 73 can be framed metallic material such as in chain-link fence. The floor 9 can be cement and is terminated on inboard and outboard ends by the disease barrier gutters 20 (FIG. 4) previously described. These gutters 20 are remote from both the outboard gate 80 and inboard gate 85.

Referring to FIG. 16, an interconnecting gate 85 is designed for the inboard end of the compartment and incorporates a waterer 60 feeder 50 inventions within it, previously described. It extends vertically from the floorline 9 to the ceiling 73 of the compartment. Transversely, it is hinged on one siide 75, FIG. 16 while latches on the other side 76. The hinges 75 are fashioned with bolts to the barrier wall 70 by vertical angle iron 77 on the opposite side of the wall from gate 80 or 85 and hinge 75. The vertical angle iron 77 serves as a stop for the next run gate 80 or 85 against which its gate latch 76 touches, thus eliminating the need for a gate corner post in each run. The outer gate 80 FIG. 18 may contain a splash curtain for preventing waste and water from splashing over the gutter 20 (FIG. 5) and onto walkways 2, 3, or 4 (FIG. 4).

Sufficient vertical clearance is allowed in the gates 80 and 85 to allow water, debris, etc., to pass beneath them to the disease barrier gutter 20 (FIG. 5).

Intermediate to the outboard and disease barrier gate 80 and inboard end porous gate 85 is a wall 5, or dividing wall 5, FIG. 1, in which a four-way door 110 is mounted as in FIG. 18. This door 110 allows for entrance and exit from each of two compartment halves; one is the feeding or inboard end 95, and the other is the run or outboard end 100. This swinging door 110 is so designed so as to control an animal's presence between the two compartment halves 95 and 100, and within each half, as the animal is in one of these two areas. These combinations of movements are controlled by 4 positions of a rotary latch 120 or pawl mechanism (FIG. 20). These 4 positions of the latch or pawl are (FIG. 19):

1. One way out (FIG. 21).
2. One way in (FIG. 23).
3. Both ways, free to egress/ingress to a given area (FIG. 24), and
4. Locked, to either direction (FIG. 22).

Figure 19:
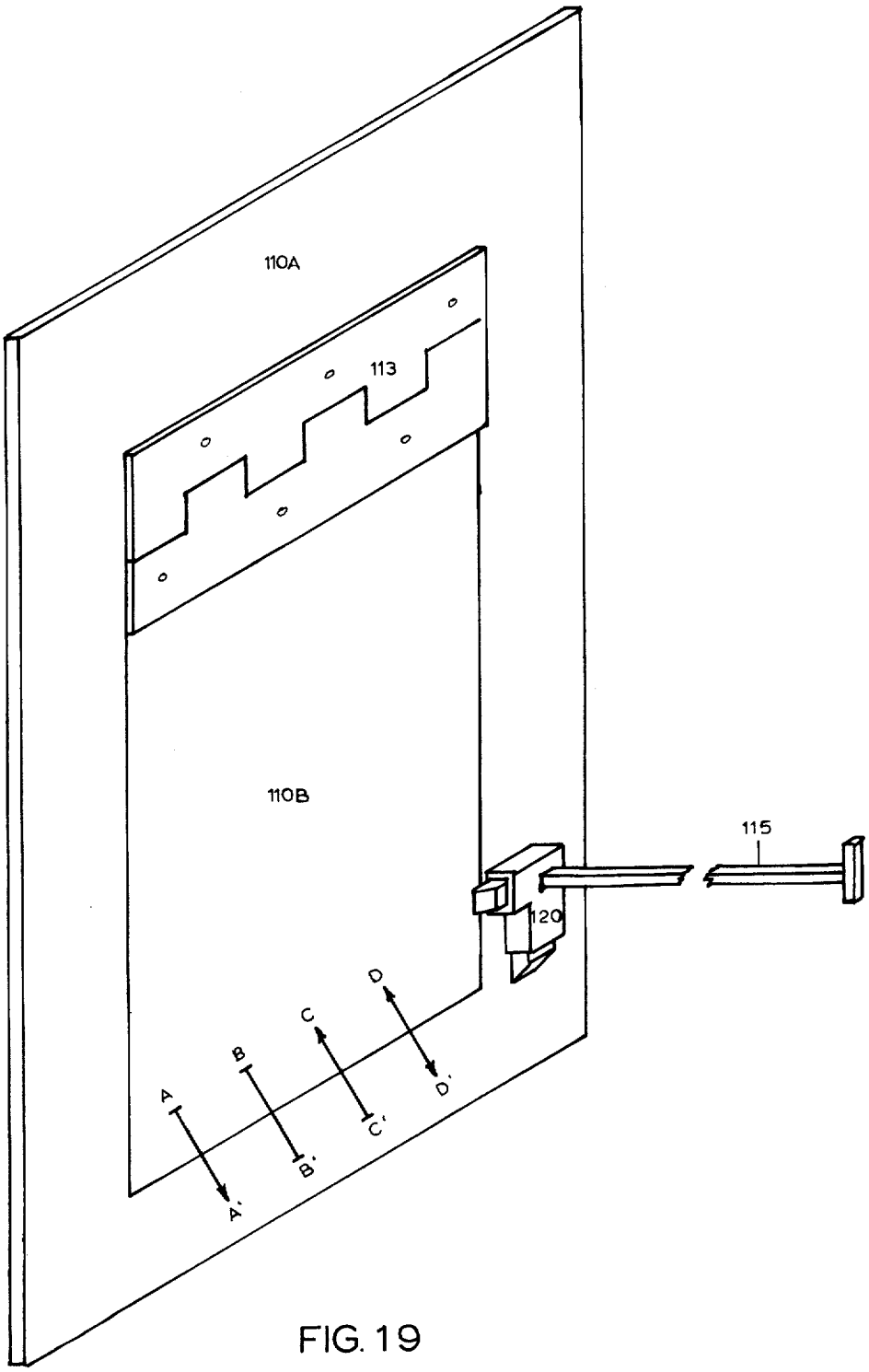

The four-way door mechanism comprises four basic parts; they are (FIG. 19) the frame for the door 110A, the door proper 110B, the hingee 113 (which allows the door to return to the closed or alignment position), and 120 the rotary latch or lock. The key to the objective success of this four-way door 110 lies with the rotary latch 120. Its four positions are covered now with aid of FIG. 20. The rotary latch is essentially a four-way lock or moving double latch/bolt mechanism mounted in the frame 110A (FIG. 19), such that a combination of latch positions A, B, C, and D, of FIGS. 21, 22, 23, 24, allows the door 110B (FIG. 19), to be free to move in either direction or as restrained, as described following. That which rotates the latch or combination of latches, as in FIG. 20, is a simple rod 115 for turning from outside of the compartment (FIG. 18) at either end. The extensions for turning the four-way latch would be conventional and myriad, so they are not shown. The operation of the door latch and animal positioning is as follows:

OUT (AA) of FIGS. 19 and 21—When door strikes inclined spring-loaded latch 123 FIG. 20 door is allowed to depress and move past it, but is stopped on returning by the solidly extended bolt-latch 123.

LOCKED (BB) of FIGS. 19 and 22—Swinging door striking either the 122a or 122b FIG. 20 spring-loaded latch is allowed to depress it, but when striking the second one, is locked between two latches.

IN (CC') of FIGS. 19 and 23—When door strikes inclined spring-loaded latch 121 FIG. 20 door is allowed to depress and move past, but is stopped on returning to the solidly extended bolt-latch 121.

EITHER WAY (DD') of FIGS. 19 and 24—When the latch group is in this position (no latches or bolts in the path of the swinging door 110B (of FIG. 19), the swinging door is free to move in both directions, or either direction (124 of FIG. 20 shows no latch in the path of door). This device possesses a 'fail-safe' feature in that when door does not center itself, the slightest pressure from an animal will cause any of the proper bolts 121, 122a, 122b, and 123 to be depressed so an animal is not trapped on undesired side if a door 110 (FIG. 19) has not returned to dead center when the kennel man programs door.

Figure 25:
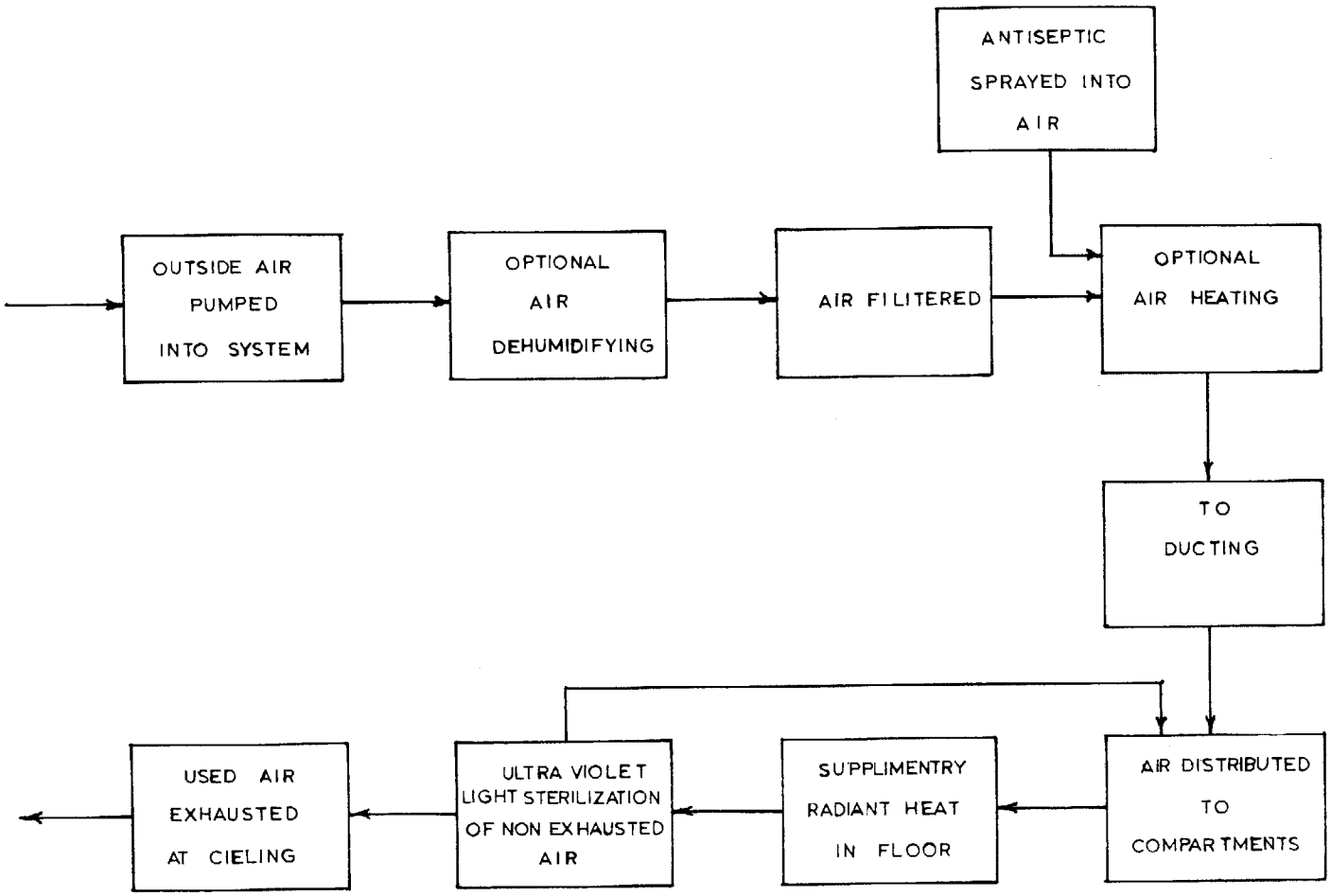
FIG. 25 is a schematic flow diagram of the complete airflow system cycle.

The next invention element has to do with the air conditioning and air flow control FIG. 26 in a kennel, animal shelter. The general oobjective of air flow control within a kennel or animal shelter is to provide an individual air flow of fresh sterile air to each run and feeding area in the interior of building by means of separate air input manifolds 144 in each kennel compartment. These individualized inputs 144 are necessary to avoid having air flow across the building as would happen in a more generalized air conditioning system, which would cause cross-contamination by the passage of air from one kennel compartment to another. (As has been previously described, the pie shaped compartments of the kennel (FIG. 1) each separated by a disease barrier wall 70 FIG. 18 facilitates the channeling or funneling of air within a run). Body heat of the animals causes contaminated air to rise convectively in the compartment to ceiling level 142, FIG. 26, where low level exhaust fans 13 remove a large portion of the contaminated air. That portion of contaminated air which is not removed (because of recirculating currents and fresh injections of outside air through air input manifolds 144, is treated passively in a macroscopic manner by ultraviolet lamps 14, mounted in an array coverage from the disease barrier walls 70, and also from the ceiling or walls. FIG. 25 is a functional diagram of the air flow system as envisioned by the inventor. Fundamental steps are:

AIR INGESTION
DEHUMIDIFICATION
FILTERING
(OPTIONAL SPRAYING WITH ANTISEPTIC)
(OPTIONAL HEATING)
AIR TO DUCTING
DISTRIBUTION TO INDIVIDUAL RUNS
OPTIONAL RADIANT HEATING
STERILIZATION OF AIR
EXHAUSTION OF MOST AIR
RECIRCULATION OF REMAINING AIR
CYCLE REPEAT

If supplementary heat is needed in the winter, radiant heat is supplied by water pipes in the floor 145, FIG. 26. The unique aspect of this air flow system is the role the animal plays in initiating the rise of contaminated air by convection to the ceiling area 142 by virtue of its own body heat; radiant heating from the floor accelerates the convective process, but is not depended upon to hasten the contaminated air to the proportional flow exhaust fans 13 where most of the germ-laden air is exported to the region of relative safety (to the animals) or decontamination by natural ultraviolet processes. The resulting air flow pattern of these convection currents is shown by the arrows 146 in FIG. 26. Air which is exhaled by the animal (and possibly reinforced by radiant heating) rises toward the ceiling area 142, passing by the ultraviolet lights 14, and being exhausted through the overhead fans 13, and passes to a point where it will not recontaminate the air intake for any kennel building. Air which is not exhausted will cool and fall towards the unheated unoccupied corridors 2 and 3, and in falling pass once again by the ultraviolet lights 14. What has been described is unique to animal shelters, and indeed to most of the air conditioning community, in that with most conventional air conditioning, large quantities of air are forcibly injected into a room or portion of a building without answering the commensurate problem of "where does the contaminated air go?" It is allowed to 'seep' out wherever the pressurizing influences of air conditioning forces it through crevices or natural openings, and once exhausted, it is often allowed to contaminate the fresh input air, which does not occur in present invention.

What has been described is a preferred form of the invention; it is apparent that the invention is capable of modification and variation from the form shown, so that the scope thereof should be limited only by the scope of the claims appended hereto.

I claim, therefore:

1. A circular kennel building having a floor, at least one annular ring of wedge-shaped kennel compartments located on said floor within a perimeter of said kennel buildings, each said compartment having two solid side walls *with at least one of said walls being shared with an adjacent compartment*, an innermost end gate and an outermost end gate, each said compartment being [bisected into an outboard run and a feeding watering section by a bisecting wall extending between two sidewalls, swinging door means located in said bisecting wall, automatic swinging door latch means to control opening of said swinging door means, access swinging door means located in said bisecting wall, animal feeder means located in said wedge-shaped compartment,] *covered by a ceiling of perforated material, each of said two solid sidewalls extending substantially above said ceiling and past said innermost and said outermost gates;* servicing corridor means located annularly in said kennel building, each said compartment having one end [wall] *gate* in contact with said corridor *and a bisecting wall extending between said two side walls dividing said compartment into an outboard run and a feeding-watering section*, [annular gutter means located in said floor adjacent said inner most end wall and said outermost end gate of each said compartment,] a circular roof extending from center of said building toward said perimeter and covering said feeding-watering section of each said compartment and covering or partially covering said outboard run section of each said compartment[, means for providing uncontaminated fresh air to each said compartment, decontamination means for sterilizing egress air leaving each said compartment, exhaust fan means located in said roof, automatic compartment cleaner means comprising radially movable hose means extending from center of said roof toward said perimeter of said building, controllable valve means on said hose means to permit control of ejectioon of wash fluid from said hose means, drive means for selectively moving said hose means successively from compartment to compartment in turn, means for motivating an animal to move from one section of each said compartment to the other section of each said compartment and control means located in said building for programming and controlling all above said means].

[2. A circular kennel building as claimed in claim 1, in which each said compartment is covered by a ceiling of perforated material, each of said two solid sidewalls extending substantially above said ceiling and past said innermost and said outermost gates having a substantial portion thereof made of perforated material, a lower portion of said outermost gates may be supplied with a downwardly depending curtain, said innermost end wall and/or gates having one side hingeably attached to one of said two side walls, an opposite side of said innermost end wall being supplied with latch means for selectively latching said opposite side to the other of said two side walls.]

[3. A circular kennel building as claimed in claim 1, in which said automatic swinging door latch means on said gate means located in said bisecting wall comprises a swinging door, having an upper end hingedly attached to an upper edge of an opening in said bisecting wall and an opposing free bottom edge, a selectively rotatable latch mechanism having four selective positions, being located in said bisecting wall adjacent a lower edge of said opening, said latch mechanism comprising a selectively rotatable bar projecting through said bisecting wall, two latch portion components being rigidly located on said bar, one on each side of said bisecting wall, to provide that in a first position of said bar, a first latch component portion extends in beyond said free edge, on one side of said swinging door and a second latch component portion extends in beyond said free edge on the other side of said swinging door to prevent said swinging door from opening in both directions, a second position of said bar providing that said first latch component portion extends beyond said free edge on said outboard run section side of said swinging door, whereas said second latch component portion does not extend beyond said free edge to provide that said swinging door may open toward said feeding watering section only, a third position of said bar providing that said second latch component portion projects beyond said free edge, said first latch component portiion not projecting beyond said free edge, to permit said swinging door to swing open toward said outboard run section only, a fourth position of said bar providing that neither said first or said second latch component portions project beyond said free edge, to permit said swinging door to open freely in either direction.]

4. A circular kennel building as claimed in claim 1[, in which said] *further comprising* annular gutter means [have ] *located in the floor adjacent said innermost and outermost end gates of each compartment having* one closer side, adjacent to said annular ring of kennel compartments and one farther side, farther from said annular ring, said farther side being provided with lip means extending obliquely toward and spaced from said closer side[, and at least one catch basin means for collecting waste from said gutters, said catch basin means being removably located in said floor and connected to said gutters].

[5. A circular kennel building as claimed in claim 1, in which said animal feeder means comprises a water drinking mechanism and a food feeder, said drinking mechanism consisting of a substantially rectangulaar shaped box, having a top and a bottom, a front and a rear surface, and two side surfaces, said box being journaled centrally at each of said side surfaces, said journals being carried by two bearings, one at each side of a first rectangular opening in said innermost end wall, said front and said rear surface, each having an open portion substantially centrally thereof, said openings each having a top edge and a bottom edge, a dividing partition connecting said top edge of said front surface with said bottom edge of said rear surface, and dividing said box into two separate compartments, said top and said bottom of said box being provided funnel means, each of said funnel means projecting through said partition, connecting said funnel in said top with bottom compartment of said box and said funnel in said bottom with top compartment of said box, said food feeder comprising a cylindrical container having a horizontal axis, said food feeder being located in a second rectangular opening adjacent said first opening in said innermost end wall, said cylindrical container being journaled axially at either end, said journals being carried in bearings in either side of said second rectangular opening, said inner portion of said cylinder being substantially bisected by a plate, an opening in side of said cylindrical container providing access to one internal compartment of said cylindrical container, said plate extending through said opening a sufficient amount to provide a rotation stop for said cylindrical container against said innermost end wall, and latch means on said innermost end wall to selectively lock said rotation stop portion of said plate onto said innermost end wall.]

[6. A circular kennel building as claimed in claim 1, in which said means for providing uncontaminated fresh air to each of said inner kennel compartments comprises an airflow system containing forced air pumpping means, duct means connecting said forced air pumping means with each said kennel compartment close to floor level and exhaust fan means in said roof, said decontamination means consisting of ultraviolet light means positioned in the path of air emanating from said kennel compartment.]

[7. A circular kennel building as claimed in claim 1, in which said means for motivating an animal to move from one section of each said compartment to the other section includes sonic sound means in each of said wedge-shaped kennel compartments, said sonic sound means being located in said outboard run section adjacent said outermost end wall, and soniic sound means located on said radially movable hose means, and means for selectively operating said sonic sound means.]

[8. A circular kennel building as claimed in claim 1, in which said wedge-shaped kennel compartments are built as individual modules, a plurality of said wedge-shaped kennel compartment modules being located on said floor to form said at least one or part of one annular ring.]

*9. A circular kennel building as in claim 1 further comprising automatic compartment cleaner means comprising radially movable hose means extending from center of said roof toward said perimeter of said building, controllable valve means on said hose means to permit control of ejection of wash fluid from said hose means, drive means for selectively moving said hose means successively from compartment to compartment in turn, and control means located in said building for programming and controlling all above said means.*

*10. A circular kennel building as in claim 1 further comprising swinging door means located in said bisecting wall, automatic swinging door latch means to control opening of said swinging door means, access swinging door means located in said bisecting wall, and means for providing uncontaminated air to each said compartment, decontamination means for sterilizing egress air leaving each said compartment, exhaust fan means located in said roof.*

*11. A circular kennel building as in claim 4 further comprising at least one catch basin means for collecting waste from said gutters, said catch basin means being removably located in said floor and connected to said gutters.*

*12. A circular kennel building as in claim 9 further including means for motivating an animal to move from one section of each said compartment to the other section, said motivation means including sonic sound means located on said radially movable hose means, and means for selectively operating said sonic sound means.*

*13. A circular kennel building as in claim 1, said bisecting wall having an automatic swinging door and latch means for controllably closing a selected opening therethrough, said swinging door being hingedly supported from its upper edge and having an opposing free bottom edge, said latch means including a selectively rotatable latch mechanism having four selective positions, being located on a wall adjacent a lower edge of said swinging door, said latch mechanism comprising a selectively rotatable bar projecting through said wall, two latch portion components being rigidly located on said bar, one on each side of said wall, to provide that in a first position of said bar, a first latch component portion extends in beyond said free edge, on one side of said swinging door and a second latch component portion extends in beyond said free edge on the other side of said swinging door to prevent said swinging door from opening in both directions, a second position of said bar providing that said first latch component portion extends beyond said free edge on one side of said swinging door, whereas said second latch component portion does not extend beyond said free edge on the other side of the swinging door to provide that said swinging door may open in the other direction only, a third position of said bar providing that said second latch component portion projects beyond said free edge, said first latch component portion not projecting beyond said free edge, to permit said swinging door to swing open toward said one direction only, a fourth position of said bar providing that neither said first or said second latch component portions project beyond said free edge, to permit said swinging door to open freely in either direction.*

* * * * *